United States Patent [19]
Smith, III

[11] Patent Number: 5,048,895
[45] Date of Patent: Sep. 17, 1991

[54] DUMP BODY TAILGATE LIFT

[76] Inventor: Walter F. Smith, III, 12444 Dixie Hwy., Holly, Mich. 48442

[21] Appl. No.: 564,422

[22] Filed: Aug. 1, 1990

[51] Int. Cl.⁵ ............................................. B60P 1/29
[52] U.S. Cl. ............................................. 298/23 DF
[58] Field of Search ............. 298/23 A, 23 F, 23 DF, 298/23 R, 23 S; 296/57.1, 60

[56] References Cited
U.S. PATENT DOCUMENTS

| | | | |
|---|---|---|---|
| 2,431,588 | 11/1947 | Sharpe | 298/23 DF |
| 2,480,609 | 8/1949 | Rathgeber | 298/23 DF |
| 3,738,707 | 6/1973 | Bieber | 298/23 DF X |
| 4,621,858 | 11/1986 | Hagenbuch | 298/23 DF X |

FOREIGN PATENT DOCUMENTS 1543210  3/1967  France ........................... 298/23 DF Primary Examiner—Frank E. Werner
Assistant Examiner—Craig Slavin

[57] ABSTRACT

A cable hoisting system primarily used to raise and lower dump body tailgates has two cables attached to each eyelet of a tailgate at one end and attached to a frame mounted, spring loaded reel at the other end. Locking the reel and raising the dump box causes both cables to be pulled through a series of channels and cable guides until tailgate is pulled firmly into a closed position so that hinge pins can be easily inserted from the ground. Tailgate closing can be fully automated by the addition of a air actuated and dash controlled reel locking and unlocking device. Each cable series has a spring of sufficient strength to forgive either erroneous reel locking or excess tension.

4 Claims, 1 Drawing Sheet

DUMP BODY TAILGATE LIFT

BACKGROUND OF INVENTION

Prior Art

Currently, dump truck tailgates are lowered and raised by hand, a fixed ceiling winch, or a tractor equipt with a front end loader bucket. Unlike this invention, prior art requires that a person scale the dump body to insert hinge pins.

SUMMARY OF THE INVENTION

The cable actuated tailgate lift of the present invention is designed to lift all dump body tailgates to a vertically closed position by means of a fixed cable system. This system uses a cable with one end attached to the dump body tailgate, plumb through the top hollow rail of the dump body and finally attached to a spring loaded, and frame mounted reel. With the dump body and the tailgate in a lowered state (horizontally paralled) the tailgate is raised by means of locking reel into a fixed position and raising the dump body to the dump (discharge) position. The hinge pins may be installed without executing the dangerous and treacherous climb into the dump body. Further, should hinge points fail, this Gate Lift invention will secure the heavy tailgate until repairs could be performed. Additionally, the present invention will allow the lowering of the tailgate by reversing the closing method.

OBJECTS OF THE PRESENT INVENTION

It is therefore the principle object of the present invention to provide a safe, economical, non-ground bearing, mechanical means to close the tailgate of various dump bodies.

DESCRIPTION OF THE PREFERRED EMBODIMENT

Figure 1:
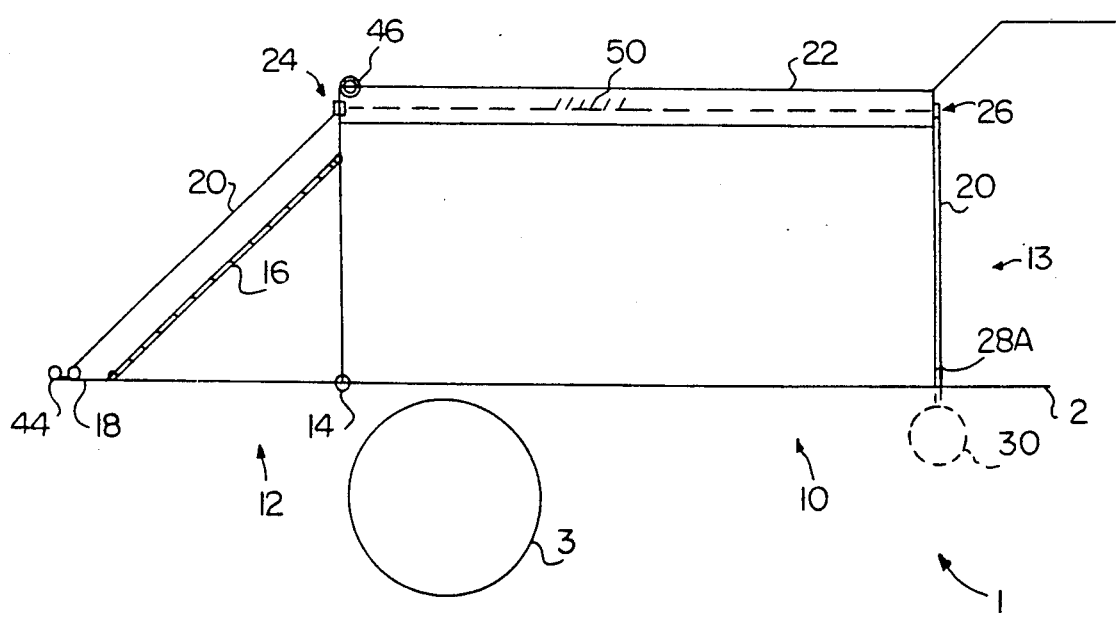
FIG. 1 is a side view of a truck dump body in its lowered position incorporating the tailgate lift system of the present invention.
Figure 2:
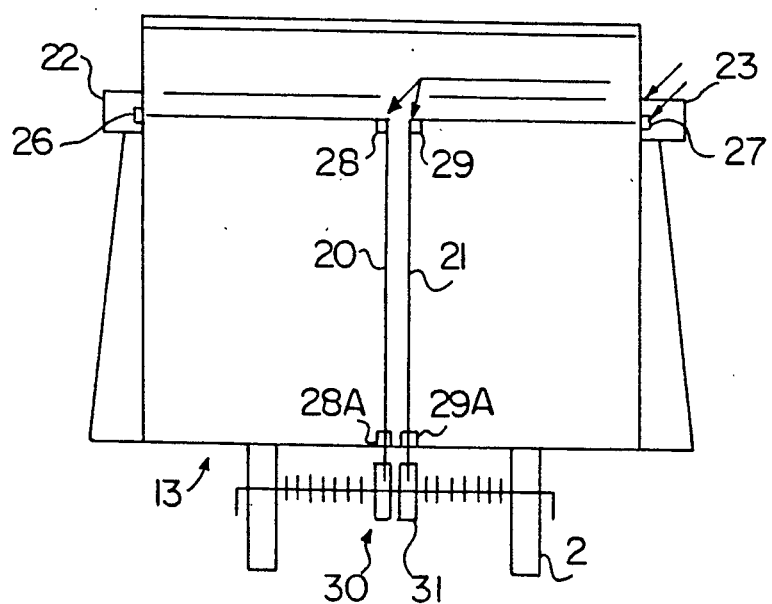
FIG. 2 is a front view of the truck dump body and tailgate lift system of FIG. 1 in the its lowered position.

Turning to the drawings, and referring first to FIG. 1, a truck 1 having frame 2, wheels 3 and dump body 10 with a tailgate 12 pivotally mounted thereon at 14 is illustrated. Chain 16 prevents tailgate 12 from rotating beyond a desired level. A pair of cables 20, 21 are attached at respective ends of the top portion 18 of tailgate 12, run upwardly to and through cable guides 24 (a similar guide is mounted on the opposite side of the dump body and is not shown) at the rearward portion of boxed top rails 22, 23, horizontally through boxed top rails 22, 23, along the front portion 13 of dump body 10, through cable guides 28, 29 as illustrated in FIG. 2 and downwardly therefrom through cable guides 28a, 29a and finally to reels 30, 31 mounted on frame 11 of truck 1.

Reels 30, 31 are spring loaded to allow for ready take up of any slack in the cables 20, 21. Reels 30, 31 are further equipped with a locking device whose function will be described hereafter.

Figure 3:
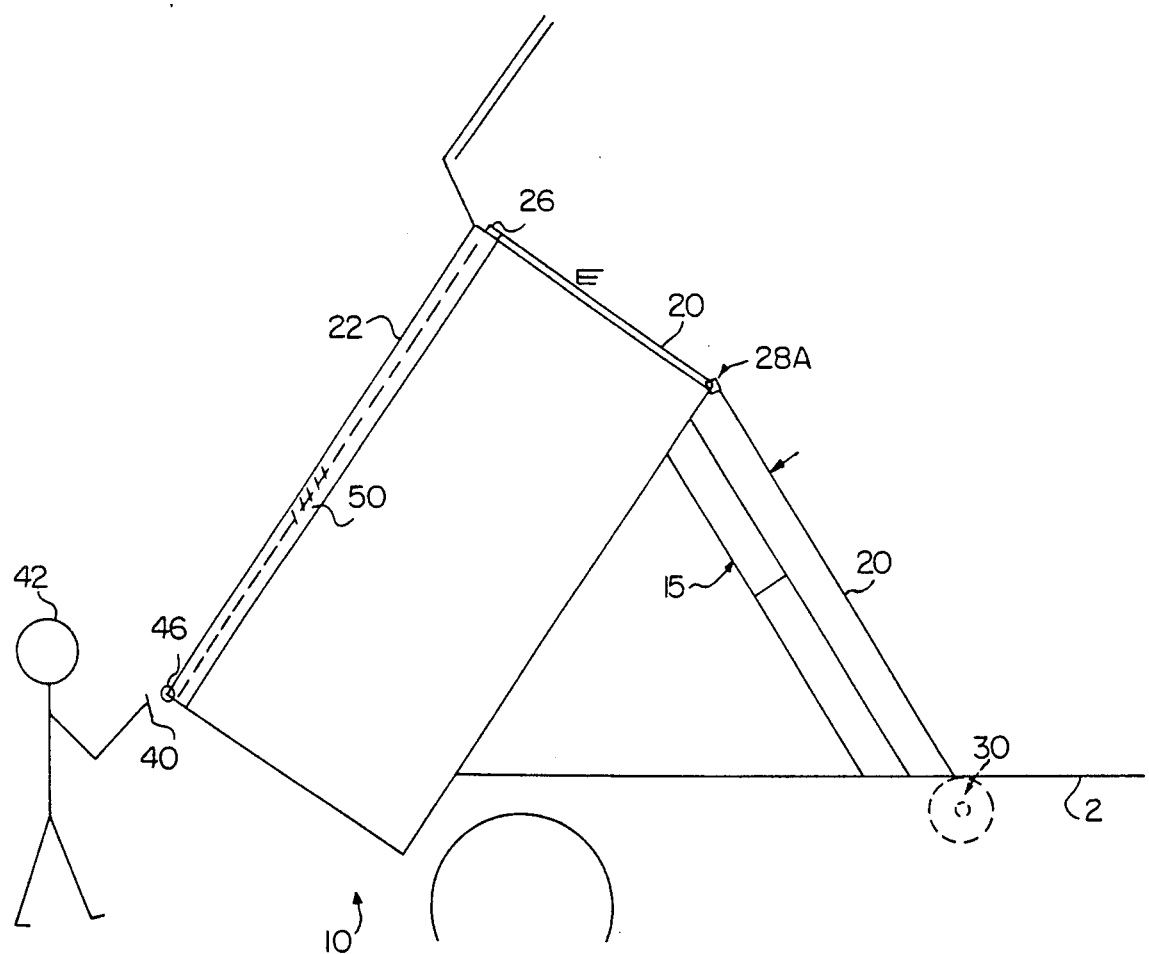
FIG. 3 is a side view the truck dump body and tailgate lift system of FIG. 1 in the raised position.

In accordance with the invention, the closing of open tailgate 12 (FIG. 1) is facilitated by locking reels 30, 31 and raising dump body 10 by means of hydraulic actuator 15 or the like to the position shown in FIG. 3 whereby cables 20, 21 pull tailgate 12 to the closed position. As tailgate 12 is closed while in a lowered position relative to the ground, worker 42 can easily insert hinge pins 40 into the corresponding apertures 44, 46 of the tailgate 12 and dump body 10 (as well as similar apertures on the opposite side of the dump body & not shown), to lock the tailgate in the closed position without climbing onto the dump body 10. The dump body 10 is then lowered and the reels 30, 31 are unlocked to allow the excess cable to be taken up. Additionally, cables 20, 21 are equipped with springs 50 to further take up slack therein. The reels 30, 31 are then locked to allow cables 20, 21 to serve as safety mechanism for keeping tailgate 12 closed in the event that hinge pin 40 fail during truck travel.

The lowering of tailgate 12 can be accomplished by reversing the above method steps and the dumping of the contents of dump body 10 is accomplished by simply unlocking reels 30, 31, thus allowing additional cable to be released, and raising the dump body 10.

Those having the skill in the art to which the present invention pertains will now understand that what has been disclosed herein compreses a novel and advantageous mechanical means to raise and lower the heavy tailgate of a dump body.

As a result of the applicant's teaching herein a variety of modifications and additions will be perceived. By way of example, various alternative tailgate fabrications can be implemented to provide the tailgate closing of the present invention without utilizing specific components and fabrication designs described herein. However, all such modifications and additons are deemed to be within the scope of the present invention which is to be limited only by the claims appended hereto.

I claim:

1. A tension actuated cable hoist system for raising and lowering a tailgate on a truck having a frame, a dump body and actuating means for raising the dump body, said cable hoist system comprising;
    a pair of cables having first and second ends, said first ends attached to said tailgate;
    attachment means for fixedly attaching said second ends of said cables to said frame;
    means for taking up slack in said cables; and
    guide means for routing said cables from said tailgate, through said dump body and to said attachment means;
    whereby said tailgate is raised by raising said dump body with said actuating means and said tailgate is lowered by lowering said dump body by deactivating said actuating means.

2. A tension actuated cable hoist system as set forth in claim 1, wherein said attachment means comprises a pair of lockable take-up reels.

3. A tension actuated cable hoist system as set forth in claim 2, wherein said means for taking up slack comprises springs in said lockable take-up reels.

4. A tension acutated cable hoist system as set forth in claim 3, wherein said means for taking up slack further comprises springs spliced into said cables.

* * * * *